Patented Mar. 14, 1950

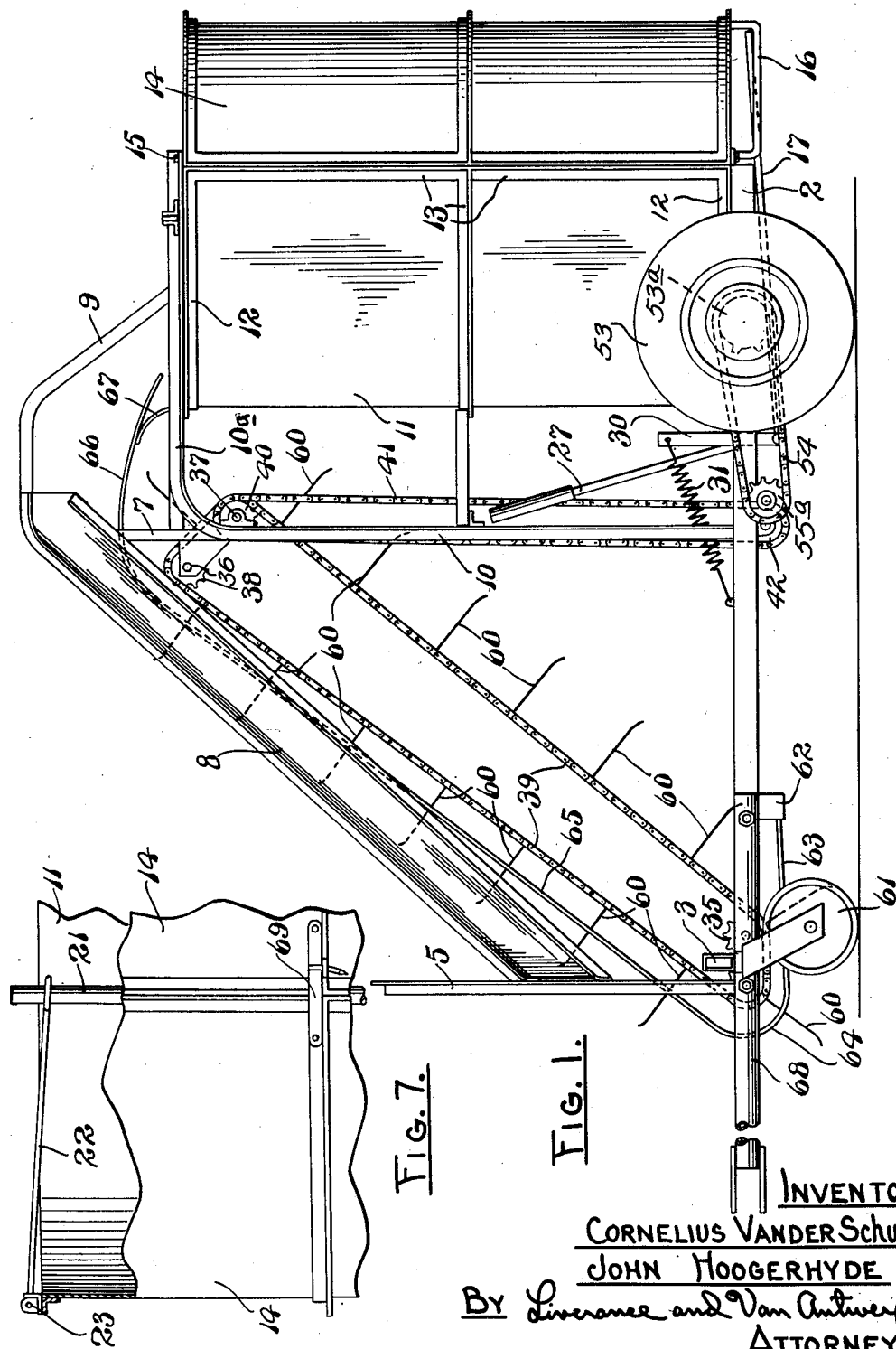

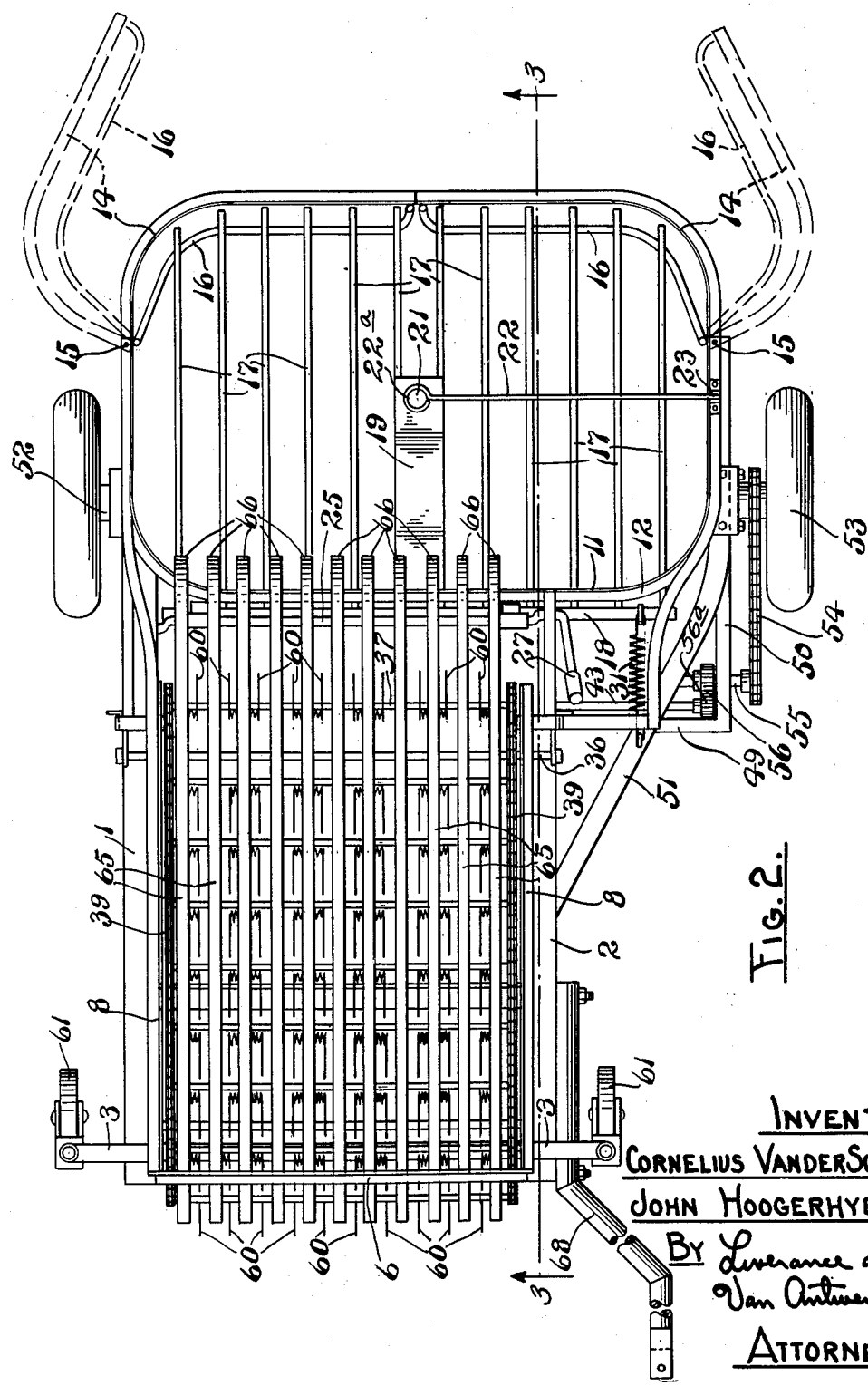

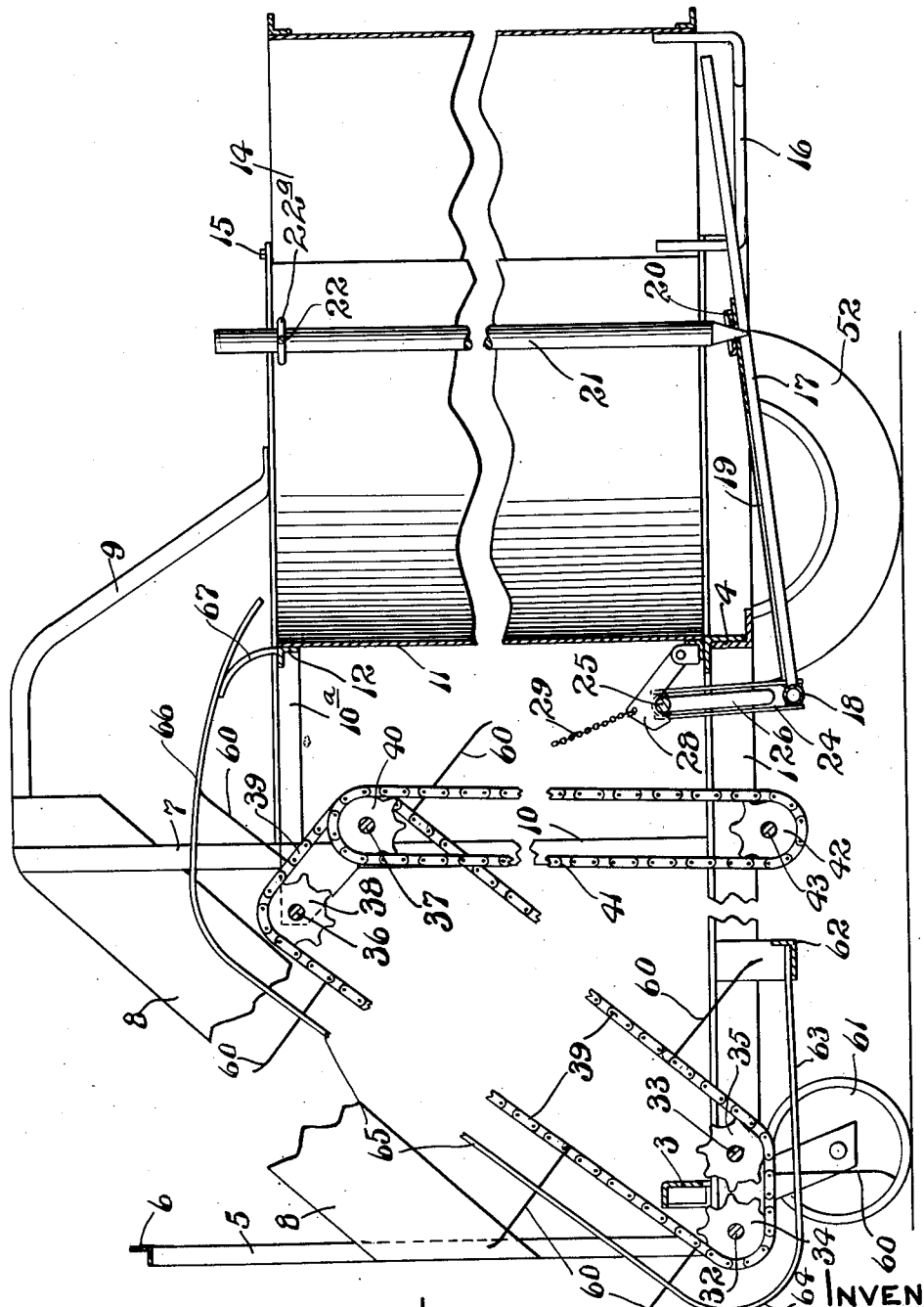

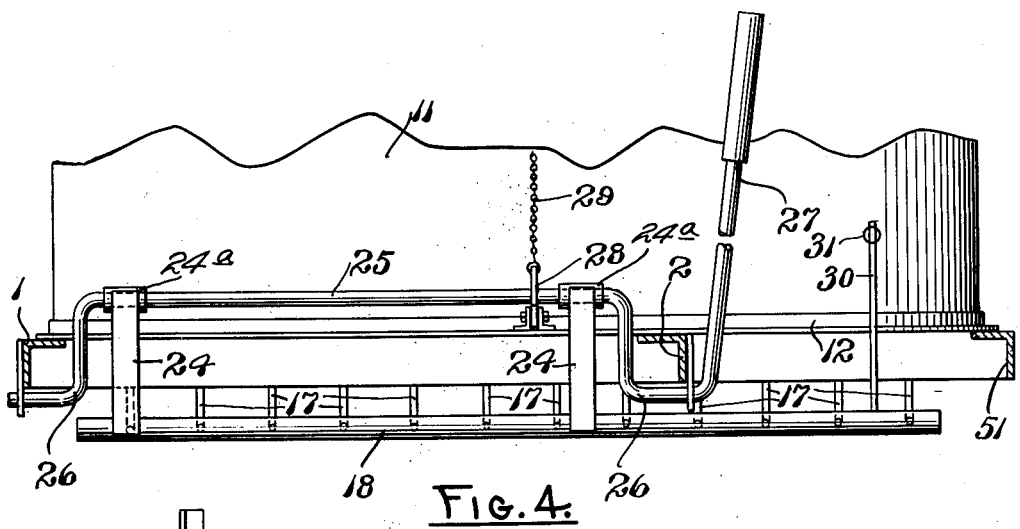
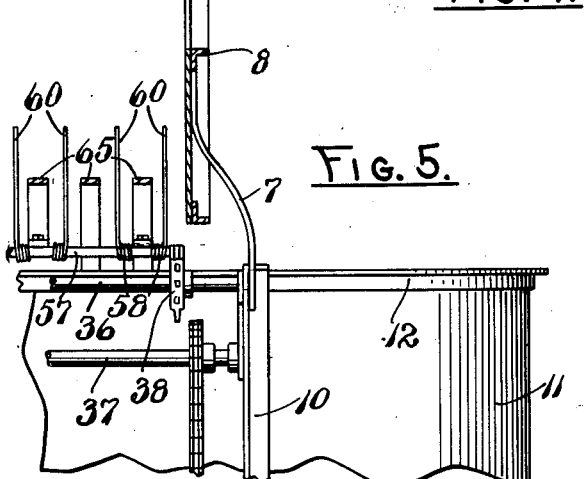
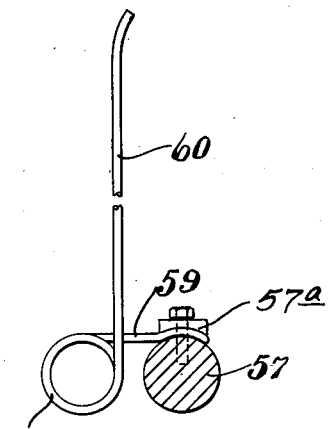

2,500,441

UNITED STATES PATENT OFFICE 2,500,441

BEAN STACKER

Cornelius Vander Schuur and John Hoogerhyde, Grand Rapids, Mich., assignors to Hoogerhyde Metal Products Company, Grand Rapids, Mich., a partnership Application December 29, 1945, Serial No. 638,278

6 Claims. (Cl. 56—346)

This invention relates to a bean gatherer and stacker, which may be either horse or tractor drawn, for picking up and gathering beans after they have been pulled in the usual manner, and convey them from the row in which they are located to a vertical holder or hopper which receives them; and after the hopper has been filled, it is opened at the rear, the bottom structure on which the stacked beans within the hopper are supported is lowered and the stack left on the ground.

In the use of our invention a vertical stake or post may be carried at a central position in the hopper, around which the beans are collected and stacked, and the dropping of the supporting bottom structure disconnects it from the lower end of the stake or post which is retained by the frictional pressure of the beans, and after the stock has been delivered from the machine, the stake, pointed at its lower end, is driven into the ground, thereby holding the stack in an upright position and aiding in the curing of the beans.

With our invention an expeditious and economical gathering and stacking of the beans is attained and the beans are left in a better condition for curing them than with the older methods of raking out the pulled beans from the dirt in which they may be partially embedded and collecting them into small piles for curing.

An understanding of the invention and of a preferred construction which has been devised to embody it may be had from the following description taken in connection with the accompanying drawings, in which, Fig. 1 is a side elevation of the bean gathering and stacking machine made in accordance with our invention.

Fig. 2 is a plan view thereof.

Fig. 3 is a longitudinal vertical section on the line 3—3 of Fig. 2, with parts broken away for a better and enlarged disclosure.

Fig. 4 is a fragmentary transverse section and elevation illustrative of the mechanism used for controlling the supporting bottom at the lower end of the hopper.

Fig. 5 is a fragmentary vertical transverse section illustrating the detachable driving connection one of the supporting wheels of the machine for operating the conveyor chains and bean gathering fingers.

Fig. 6 is a fragmentary enlarged transverse section of one of the plurality of bars or rods carrying the gathering fingers, one of said fingers being shown in elevation, and Fig. 7 is a fragmentary rear elevation of the hopper with parts shown in section.

Like reference characters refer to like parts in the different figures of the drawings.

A lower supporting framework is provided having spaced horizontal side or chassis bars 1 and 2 which may be connected by transverse front bars 3 and 4, all of said bars being of commercial rolled forms of iron for strength and lightness. At the front end of the machine a vertical frame having spaced side posts 5 connected by an integral upper cross member 6 is secured at the lower ends of the posts to the sides of the frame. Intermediate the length of the frame supporting members 7, occupying generally vertical positions are used which in turn are connected to other frame portions of the machine later described. The posts 5 and members 7 are used to secure inclined fixed sides 8 in place, one of which is at each side of the upwardly and rearwardly conveying carrier which carries the beans upwardly and to the rear after they have been picked from the ground for delivery at the upper end of the hopper. The rear ends of the sides 8 may be strengthened and supported by braces 9 connected at one end to the sides 8, as shown, and at their other ends to horizontal rear extensions 10a at the upper ends of vertical posts 10 back of the posts 5, and to which posts 10 the supporting members 7 previously described are permanently connected.

The horizontal upper extensions 10a of the frame members described reach to and at each side of the upper end of the hopper (Fig. 1). The hopper includes a forward fixed section 11 of sheet metal reinforced at its upper and lower ends by angle bars 12, and intermediate its ends and adjacent its rear edges by similar bars 13, the rear extensions 10a having a permanent connection, such as welding, to the upper strengthening bars 12, and the lower bars 12 having connection to the lower supporting horizontal side and cross members 1, 2 and 4. The front member of the hopper 11 has spaced sides extending to the rear and at the rear edges of each a door 14 is hingedly mounted, as at 15, for swinging movement. When the two doors are brought together, as shown in full lines in Fig. 2, the body of the hopper is closed. The doors however may be swung outwardly as shown in dash lines in Fig. 2, thereby fully opening the hopper at its rear side. Each of the doors, as best shown in Fig. 2, at its inner side and near its lower end is provided with a supporting rod 16 permanently connected.

The hopper is open at its upper end and, thus far as has been described, at its lower end. A bottom supporting structure is provided at the lower end of the hopper consisting of a plurality of spaced preferably parallel bars or rods 17 which extend from front to rear and at their front ends, a short distance in front of the front side of the hopper are all connected to a cross rod or shaft 18. In the use of the machine when the doors are closed the free rear end portions of the rods or bars 17 rest upon the supports 16. Additionally, a flat metal plate 19 is carried at the upper side of the two middle rods or bars 17 and may extend from the shaft 18 approximately one-half of the distance to the doors when they are in closed position. At the rear end of the plate 19 a receiving socket plate 20 (Fig. 3) is secured having an opening therethrough in conjunction with a similar opening immediately below in the plate 19, and the pointed lower end of a post or stake 21 may extend partly through said openings. The upper end portion of the stake is designed to pass through a circular eye or loop 22a made at the free end of a rod 22 which (Fig. 2) extends to an adjacent side of the hopper, and has a pivotal connection at 23 so that it may be turned upwardly for disengagement from the stake or downwardly to engage therewith, thereby holding the stake in proper vertical position.

From the rod or shaft 18 (Fig. 4) two spaced vertical bars 24 extend upwardly and are carried on a crank shaft 25, having sleeves 24a at their upper ends through which the shaft passes. The shaft 25 at each end portion is formed as a crank 26, which cranks at their ends are mounted upon suitable bearings 26a carried by the side frame members 1 and 2 to turn about a horizontal axis. One of the cranks is extended and bent in an upward and forward direction and supplied with a handle as shown at 27 for manual operation of the crank shaft. In the normal operation of the machine the handle 27 occupies an upper position as shown in Fig. 1 and the shaft is maintained in such position by a latch 28 (Fig. 3) in the form of a hook, pivotally connected at 28a immediately in front and at the lower end of the hopper. The latch may be disengaged by pulling a chain 29 secured thereto.

When such disengagement occurs the crank shaft 25 tends to turn in a downward and forward direction with an accompanying downward and forward movement of the supporting rod 18, the bars 17 being lowered and moved forwardly; or force may be applied to the handle 27 to cause the described movement. This serves to lower the plate 19 and the socket 20, disconnecting from the post 21 which is held by the gathered beans in the hopper packed around the post and filling the hopper and pressing against it at its inner sides and at the inner sides of the rear doors 14. Then upon opening the doors, and moving the machine as in a forward direction, and with the supporting rods 17 by that time lowered to the ground, the beans stacked within the hopper and around the vertical post will drop downwardly to the ground with the lower end of the post closely adjacent the ground surface; and a further forward movement of the machine will draw it away from the stack, the bars 17 sliding freely in a forward direction therefrom. Thereafter the stake 21 will be driven into the ground, leaving the stacked beans vertically supported and with a center stake, usually of wood, which as well known, will aid in the curing of the beans. An arm 30 extends upwardly from the rod 18 (Fig. 1) and is under the influence of a tension spring 31 tending to lift the rear free end portions of the bars 17 and hold them in their slightly upwardly rearwardly inclined position shown in Fig. 3. When the rock shaft 25 is released by the releasing of latch 28, with a consequent lowering of the rod 18, the arm 30 is simultaneously lowered and the force of the spring 31 diminished, this aiding in disengaging from the lower end of the stake 21.

At the front end of the frame two spaced parallel horizontal shafts 32 and 33 extending across the machine and between the chassis sides 1 and 2 are mounted, on which sprocket wheels 34 and 35 are secured, one adjacent each side frame member 1 and 2. Upwardly and to the rear and carried by the vertical frame members 10, and suitable brackets connected thereto, two other horizontal shafts 36 and 37 are mounted for rotation, the shaft 36 being at a higher level and in front of the shaft 37 as shown in Fig. 3. Sprocket wheels 38 are carried by said shafts located in the same vertical planes with the sprocket wheels 34 and 35. Endless chains 39 are mounted to extend around the wheels 34, 35 and 38, one at each side of the machine.

The shaft 37 has an additional sprocket wheel 40 secured thereto over and around which an endless drive chain 41 is installed. At its lower end portion it passes around a like sprocket wheel 42 loosely mounted on a horizontal shaft 43 carried at the under side of the frame. As shown in Fig. 5 the lower sprocket wheel 42 at one side is equipped with a clutch member 44. A second clutch member 45 movable on the shaft 43 toward and away from the clutch member 44 is splined or otherwise connected with the shaft 43 to turn therewith. The clutch member 45 normally is moved toward and into engagement with the clutch member 44 by a spring 46, but may be disengaged by operating a yoke 47 connected therewith in the usual manner, being moved by a hand lever 48. As later described the shaft 43 is continuously turned when the machine is being drawn over the ground. When the clutch members are engaged, the chain 41 drives the shaft 37 thereby continuously operating the conveyor chains 39. In moving to the beans to be gathered or away therefrom such conveyor chain movement is not needed, and the clutch will be disconnected by operation of the hand lever 48 and held disconnected until a time when the elevating conveying movement of the chains 39 is needed.

At the side of the machine nearest which the driving chain 41 is mounted, other lower frame members 49, 50 and 51, as best shown in Fig. 2, are provided extending between the side 2 and one end of the hopper. The rear portion of the machine is supported by wheels 52 and 53 one at each side of the machine which turn upon the ground when the machine is pulled in a forward direction. The wheel 53 is equipped with a sprocket 53a which drives an endless chain 54 which goes around a driven sprocket 55a on a short shaft 55 mounted immediately back of and supported on a bearing 55b on the frame members 50 and 51. The two shafts 43 and 55 carry intermeshing gears at 56 and 56a (Fig. 2) whereby the shaft 43 is continuously driven by the wheel 53 when the machine is pulled over the ground.

At spaced distances in the length of the endless conveyor chains 39, rods 57 are secured extending across from one chain to the other, and to each of said rods a plurality of members made from spring wire rod are permanently connected. In each of such members (Fig. 6), an intermediate portion of the wire rod is coiled into a spring 58, from which, at one end, a short arm 59 extends which is attached to the rod 57 by a clamp 57a. A longer spring arm or finger 60 extends from the coiled spring 58, and is located substantially at right angles to the length of the chains where positioned, as best shown in Fig. 3.

The front end of the machine is carried by wheels 61, one at each side of the frame and swivel mounted to turn upon vertical axes on extensions to the front cross frame bar 3. The wheels 61 are mounted substantially at the same transverse position of the frame as the sprocket wheels 34 and 35 (Fig. 3) so that the lower horizontal run of the chain extending between such sprocket wheels is maintained at a substantially constant distance above the ground. Therefore when the spring fingers 60 are moved through such horizontal run of the chain, they move parallel to the ground and with their free forwardly bent ends but a short distance above the lower sides of the wheels 61 (Fig. 3).

A horizontal cross bar 62 is suspended between the chassis side frame members 1 and 2 a short distance back of the front end of the machine (Fig. 3). To it a plurality of spaced flat metallic bars are connected at one end and are located to fill substantially the full width between the spaced conveyor chains 39. Each of the said bars forwardly of the bar 62, includes a horizontal section 63, which extends to and underneath the plane of the short horizontal run of the chains 39, and is then curved upwardly, as at 64, and continued as an elongated section 65, for the full length of the upper or outer runs of the chains 39, being spaced a distance above such upper runs and substantially parallel thereto. Approximately above the shaft 36, the flat bars are curved and extended in a downward and rearward direction as at 63 to and over the front portion of the upper end of the hopper, being supported by braces 67 connected with at hopper, as shown in Fig. 3. The fingers 60 pass between these spaced bars, of which in the drawing eleven are shown, extending below the lower sections 63, and above the inclined sections 65. When the fingers are carried downwardly and to the rear on the runs of the chain between shafts 36 and 37, they progressively move in a downward direction and away from the upper terminal section 66 of the bars.

In operation the machine may be drawn by any suitable tractor, or by horses. A tongue 68 (Figs. 1 and 2) is connected at the front portion and at the outer side of the chassis frame member 2 for drawing the machine in a forward direction. With the bottom rods 17 positioned as in Figs. 2 and 3 at the lower end of the hopper, the machine may be moved to the end of a row of pulled beans, previously pulled by bean puller which having angularly converging shoes with sharpened inner edges brought against the outer side of two parallel rows of beans, move said rows inwardly to a single pulled row, the roots being either severed or cut from the vines or bodily pulled from the ground. The clutch members 44 and 45 are connected to drive the elevating conveyor chains 39, and the machine straddling the pulled row of beans is moved lengthwise thereof, in a forward direction. The conveyor chains are continually operated under such conditions, and the spring fingers 60 come in succession to the pulled row of beans, being a short distance horizontally in a forward direction with the free ends of the fingers engaging in the vines and then lifting and carrying the beans upwardly above the inclined bars 65, and moving them on the generally horizontal but somewhat downwardly curved terminal sections 66, being withdrawn progressively after the series of fingers across the machine passes around the upper shaft 36. Succeeding vines moved in this fashion will push those ahead rearwardly on the terminal sections 66, until they fall into the hopper.

The hopper when filled to the desired amount will contain a stack of beans around the vertical center stake 21. Such stake is removed from the hopper, as previously described, by releasing the latch 28 and operating the handle 27 to rock the rock shaft 25 with a simultaneous lowering and forward movement of the bottom support rods 17, and a disconnecting of the socket 20 from the lower pointed end of the stake. The doors 14, which have been releasably latched together by the latch 69 (Fig. 7) are unlatched and opened and the machine drawn forward, leaving the stack of beans with its inner stake on the ground; and the stake is thereafter driven a desired distance into the ground.

With this construction a clean gathering of the pulled bean vines is accomplished during the short horizontal moving of the downwardly extending fingers 60, when at their lowermost positions, and with the free lower ends of said finger 60 accurately controlled as to distance from or in connection with the ground surface because of the immediate adjacent supporting wheels 61 which conform to the ground surfaces at the places where the beans are being immediately gathered. The spring nature of the fingers 60 permits such yielding as may be necessary upon contacting stones or lumps of dirt. The last movement of the bean vines over the rear portion of sections 66 caused by their being forced to the rear by the succeeding vines forced thereagainst causes the vines with their attached pods to fall into the hopper under the influence only of gravity, insuring against opening of the bean pods and loss of the beans.

While the machine has been described in connection with gathering and stacking beans, its use in gathering other similar crops, peanuts, or anything else that may be gathered, stacked or secured in like manner is evident. The construction has had extensive development tests and operations under working conditions and has proven exceptionally satisfactory so that sales orders are readily obtained and have been obtained in considerable numbers.

The invention is defined in the appended claims and is to be considered comprehensive of all forms of structure coming within their scope.

We claim:

1. A machine as described comprising a vehicle having front and rear ends, a vertical hopper at the rear of the vehicle having open top and bottom and movable rear wall sections extending the entire height of the hopper and hinged on vertical pivots, supporting means at the lower edges of said hinged rear sections, a movable bottom supported at its rear edge on said supporting means, means for pivotally mounting the forward portion of said bottom, means for releasing the rear edge of the bottom from said supporting means, a pole socket on the upper surface of said bottom, and means for introducing loose material into the upper end of said hopper as the vehicle moves forwardly.

2. The elements of claim 1 in which the means for releasing the rear edge of the bottom from said supporting means comprises means for moving its pivotally mounted forward portion in a forward direction.

3. The elements of claim 1 combined with yieldable means for raising the rear edge of said bottom.

4. A machine as described comprising a vehicle having front and rear ends, a vertical hopper at the rear of the vehicle having open top and bottom and movable rear wall sections extending the entire height of the hopper and hinged on vertical pivots, supporting means at the lower edges of said hinged rear sections, a movable bottom supported at its rear edge on said supporting means, a crank rotatably mounted near the forward part of said hopper, a rod hung on said crank and depending therefrom, the forward edge of said bottom being connected to said rod, means for releasably holding said crank in predetermined position, and means for introducing loose material into the upper end of said hopper as the vehicle moves forwardly.

5. The elements of claim 4 in which said means for releasably holding the crank holds the crank in upright position relative to its axis of rotation.

6. The elements of claim 4 combined with spring means for elevating the rear end of said bottom said spring exerting less effort than the weight of the material in the loaded hopper.

CORNELIUS VANDER SCHUUR.
JOHN HOOGERHYDE.

REFERENCES CITED

The following references are of record in the file of this patent:

UNITED STATES PATENTS

| Number | Name | Date |
|---|---|---|
| 1,290,364 | Savignac | Jan. 7, 1919 |
| 2,328,790 | Dorsey | Sept. 7, 1943 |

FOREIGN PATENTS

| Number | Country | Date |
|---|---|---|
| 87,259 | Sweden | Sept. 1, 1936 |